(12) United States Patent
Srinivasan et al.

(10) Patent No.: US 9,275,035 B2
(45) Date of Patent: Mar. 1, 2016

(54) METHOD AND SYSTEM TO DETERMINE PART-OF-SPEECH

(71) Applicants: Venkat Srinivasan, Weston, MA (US); Manaswini Garimella, Cambridge, MA (US)

(72) Inventors: Venkat Srinivasan, Weston, MA (US); Manaswini Garimella, Cambridge, MA (US)

(73) Assignee: English Helper Inc., Westwood, MA (US)

( * ) Notice: Subject to any disclaimer, the term of this patent is extended or adjusted under 35 U.S.C. 154(b) by 217 days.

(21) Appl. No.: 13/893,590

(22) Filed: May 14, 2013

(65) Prior Publication Data
US 2014/0343920 A1    Nov. 20, 2014

(51) Int. Cl.
G06F 17/28    (2006.01)
G06F 17/27    (2006.01)

(52) U.S. Cl.
CPC ..................................... G06F 17/271 (2013.01)

(58) Field of Classification Search
CPC .............. G06F 17/271; G06F 17/2745; G06F 17/30787; G06T 11/206; G10L 15/26
USPC ............................ 704/9, 2, 4, 5, 7, 8; 400/472
See application file for complete search history.

(56) References Cited

U.S. PATENT DOCUMENTS

| | | | |
|---|---|---|---|
| 6,278,967 B1 | 8/2001 | Akers | |
| 6,405,162 B1 | 6/2002 | Segond | |
| 7,827,026 B2 * | 11/2010 | Brun et al. | 704/2 |
| 2002/0077806 A1 | 6/2002 | Tarbouriech | |
| 2006/0159507 A1 * | 7/2006 | Jawerth et al. | 400/472 |
| 2012/0166942 A1 | 6/2012 | Ramerth | |

* cited by examiner

*Primary Examiner* — Charlotte M Baker
(74) *Attorney, Agent, or Firm* — William L. Botjer

(57) ABSTRACT

A computer-implemented method to determine a part-of-speech (POS) category associated with a word in a text. The method includes determining a first set of candidate POS categories associated with the word based on a dictionary. The method further includes determining one or more contexts in which the word is used in the text based on a first set of rules. The method further includes determining a second set of candidate POS categories from the first set of POS categories based on the one or more contexts. The method furthermore includes determining the POS category from the second set of candidate POS categories based on a second set of rules.

17 Claims, 4 Drawing Sheets

| Word | Candidate POS | Final POS |
|---|---|---|
| The | Article | Article |
| two | Adj, Noun, Pronoun | Adjective |
| birds | Noun | Noun |
| flew | Verb | Verb |
| over | Adverb, Noun, Preposition | Preposition |
| the | Article | Article |
| rose | Adjective, Noun, Verb | Noun |
| bushes | Noun | Noun |

| Word | Candidate POS | Final POS |
|---|---|---|
| The | Article | Article |
| two | Adj, Noun, Pronoun | Adjective |
| birds | Noun | Noun |
| flew | Verb | Verb |
| over | Adverb, Noun, Preposition | Preposition |
| the | Article | Article |
| rose | Adjective, Noun, Verb | Noun |
| bushes | Noun | Noun |

METHOD AND SYSTEM TO DETERMINE PART-OF-SPEECH

TECHNICAL FIELD

The presently disclosed embodiments are related to a linguistic system. More particularly, the presently disclosed embodiments are related to a method and system to determine a part-of-speech (POS) category associated with a word in a text.

BACKGROUND

Several techniques have been developed for part-of-speech (POS) tagging. The function of a POS tagger is to associate each word in a sequence of words with a POS category, tag or label. As many words can have multiple parts of speech, the POS tagger must be able to determine the POS category of a word based on the context of the word in the text.

In addition, certain words in the text are ambiguous since they can be used as nouns, verbs, adjectives and adverbs. In such a case, state of the art POS taggers may not be able to disambiguate the text/phrase and will provide inaccurate results. Therefore, there is a need for an improved technique to determine the POS category of a word in a sequence of words.

Generally, POS tagging is more complex in the case of incomplete or incorrect sentences. In real-world applications, documents often contain text composed of incomplete sentences, for example, titles, lists of items, subheadings, and the like. In such cases, POS taggers often incorrectly determine and tag the POS category.

Further, the existing POS taggers use statistical methods due to which the results (the POS tag category assigned to the given word in question) are not tractable at the word level. Thus, this makes the existing POS taggers less usable in generalized contexts. In addition, the existing POS taggers are not extensible without computer programming or without rebuilding the underlying statistical models, which further restricts the usefulness of such POS taggers.

SUMMARY

According to embodiments of the present invention illustrated herein, a method is provided to determine a part-of-speech (POS) category associated with a word in a text. A first set of candidate POS categories is determined associated with the word based on a dictionary. One or more contexts in which the word is used in the text are determined based on a first set of rules. A second set of candidate POS categories is determined from the first set of candidate POS categories based on the one or more contexts. Thereafter, the POS category is determined from the second set of candidate POS categories based on a second set of rules.

According to embodiments illustrated herein, the first, the second set, and a third set of rules are defined. The first set of rules includes a collection of externalized contextual rules. The second set of rules includes a logical collection of abstract rues. The abstract rules may be applied in order of decreasing priority. The second set of rules may be non linear such that the entire text is run through each of the second set of rules, and wherein each word of the text is subject to the second set of rules in a different order. The third set of rules includes a collection of spelling rules, and it is used to determine the spelling errors.

According to embodiments illustrated herein, there is provided a system that includes one or more processors and a memory. The memory is accessible by the processors, and the memory includes a selection module, a first rule module, a second rule module, and a POS tagger module.

According to embodiments illustrated herein, the selection module is configured to determine a first set of candidate POS categories of the word. The first rule module is configured to apply a first set of rules to the word to determine one or more contexts associated with the word and a second set of candidate POS categories from the first candidate POS categories based on the one or more contexts. The second rule module is configured to apply a second set of rules to the word in pre-defined order to determine the POS category from the second set of candidate POS categories. The POS tagger module is configured to assign the POS category to the word, wherein the POS category is determined based on the first set of rules and the second set of rules.

BRIEF DESCRIPTION OF DRAWINGS

The accompanying drawings illustrate various embodiments of systems, methods, and embodiments of various other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit, the scope in any manner, wherein like designations denote similar elements, and in which.

DETAILED DESCRIPTION

The present disclosure is best understood with reference to the detailed figures and description set forth herein. Various embodiments are discussed below with reference to the figures. However, those of ordinary skill in the art will readily appreciate that the detailed descriptions given herein with respect to the figures are simply for explanatory purposes as methods and systems may extend beyond the described embodiments. For example, the teachings presented and the needs of a particular application may yield multiple alternate and suitable approaches to implement functionality of any detail described herein. Therefore, any approach may extend beyond the particular implementation choices in the following embodiments described and shown.

References to "one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meanings set forth below.

A "computing device" refers to a computer, a device including a processor/microcontroller and/or any other electronic component, device or system that performs one or more operations according to one or more programming instructions. Examples of the computational device include, but are not limited to, a desktop computer, a laptop, a personal digital assistant (PDA), a smartphone, and the like. The computational device is capable of accessing (or being accessed over) a network (e.g., using wired or wireless communication capabilities).

A "network" refers to a medium that interconnects a server and various computational devices. Examples of the network include, but are not limited to, LAN, WLAN, MAN, WAN, and the Internet. Communication over the network may be performed in accordance with various communication protocols such as Transmission Control Protocol and Internet Protocol (TCP/IP), User Datagram Protocol (UDP), and IEEE 802.11n communication protocols.

A "text" refers to portions of a document or an image, which contains letters, numbers, or other characters including non-alphabetic linguistic characters such as ideograms and syllabry.

A "Part-of-speech (POS) category" refers to a linguistic category of words or more precisely lexical items, which is generally defined by the syntactic or morphological behavior of the lexical item in question. The common linguistic categories include, but are not limited to, noun, verb, adjective, adverb, preposition, pronoun, and article.

Figure 1:
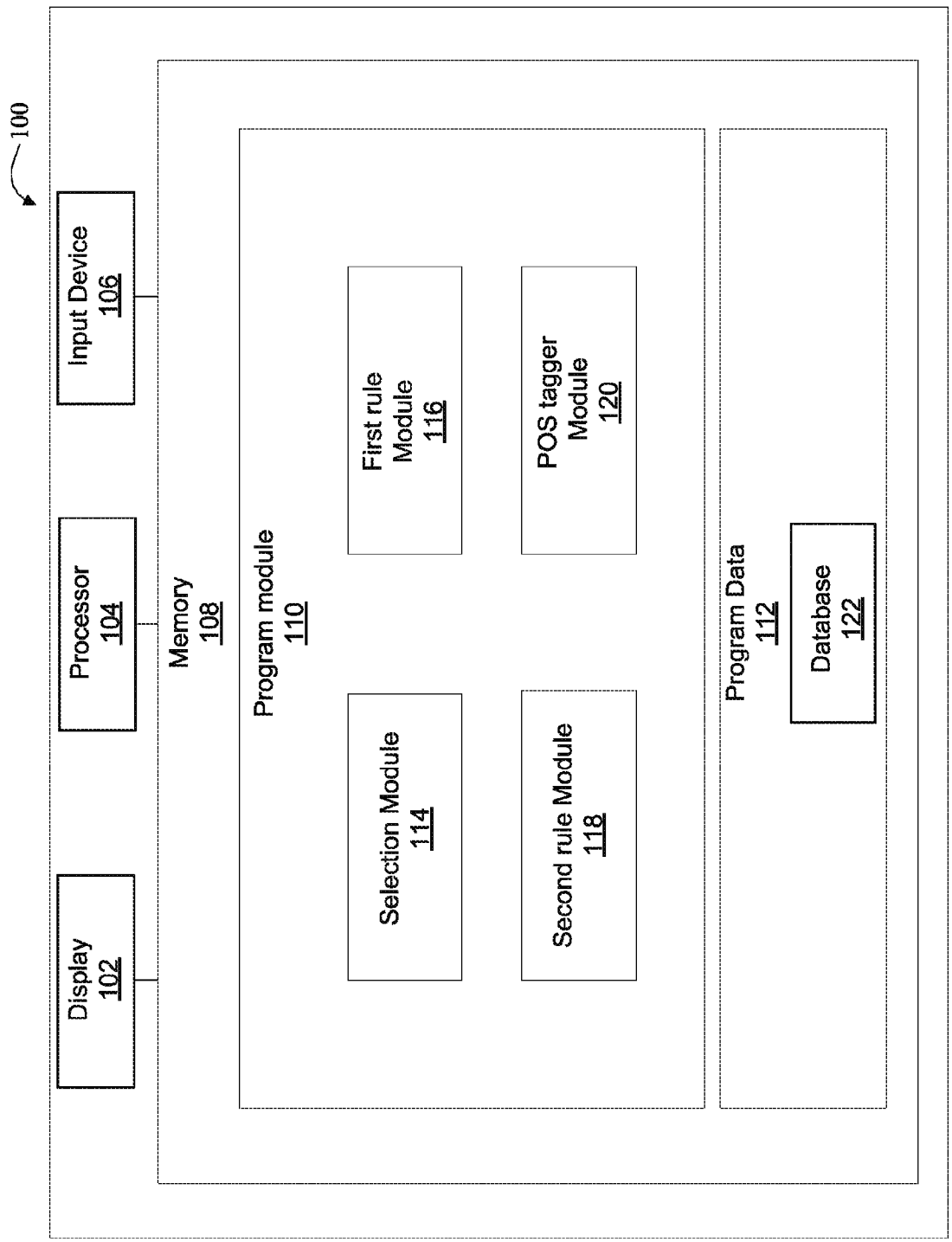
FIG. 1 is a block diagram illustrating a part-of-speech (POS) system to determine a POS category associated with a word in a text in accordance with an embodiment.

FIG. 1 is a block diagram showing various modules of a POS system 100 in accordance with an embodiment. POS system 100 includes a display 102, a processor 104, an input device 106, and a memory 108. Display 102 is configured to display a user interface to a user of POS system 100. Processor 104 is configured to execute a set of instructions stored in memory 108. Input device 106 is configured to receive a user input. Memory 108 is configured to store a set of instructions or modules.

In an embodiment, POS system 100 corresponds to a computing device, such as a personal computer, a tablet PC, a laptop, a PDA, a smartphone, a mobile phone, a Digital Living Network Alliance (DLNA)-enabled device, and the like.

Display 102 is configured to display the user interface to the user of POS system 100. Display 102 can be realized through several known technologies such as a Cathode Ray Tube (CRT) based display, a Liquid Crystal Display (LCD), a Light Emitting Diode (LED)-based display and an Organic LED display technology. Further, display 102 can be a touch screen that can be configured to receive the user input.

Processor 104 is coupled with display 102, input device 106, and memory 108. Processor 104 is configured to execute the set of instructions stored in memory 108. Processor 104 can be realized through a number of processor technologies known in the art. Examples of processor 104 may be an X86 processor, a RISC processor, an ASIC processor, a CSIC processor, or any other processor. Processor 104 fetches the set of instructions from memory 108 and executes the set of instructions.

Input device 106 is configured to receive the user input. Examples of input device 106 may include, but are not limited to, a keyboard, a mouse, a joystick, a gamepad, a stylus, or a touch screen.

Memory 108 is configured to store the set of instructions or modules. Some of the commonly known memory implementations may be, but are not limited to, a Random Access Memory (RAM), a Read-Only Memory (ROM), a Hard Disk Drive (HDD), and a secure digital (SD) card. Memory 108 includes a program module 110 and a program data 112. Program module 110 includes a set of instructions that can be executed by processor 104 to perform specific actions on POS system 100. Program module 110 further includes a selection module 114, a first rule module 116, a second rule module 118, and a POS tagger module 120.

Program data 112 includes a database 122. Database 122 corresponds to a storage device that stores the data submitted from and/or required by selection module 114, first rule module 116, second rule module 118, and POS tagger module 120. Database 122 can be implemented by using several technologies that are well known to those skilled in the art. Some examples of technologies may include, but are not limited to, MySQL®, Microsoft SQL®, and the like. In an embodiment, database 122 may be implemented as cloud storage. Examples of cloud storage may include, but are not limited to, Amazon E3®, Hadoop® distributed file system, and the like.

Figure 2:
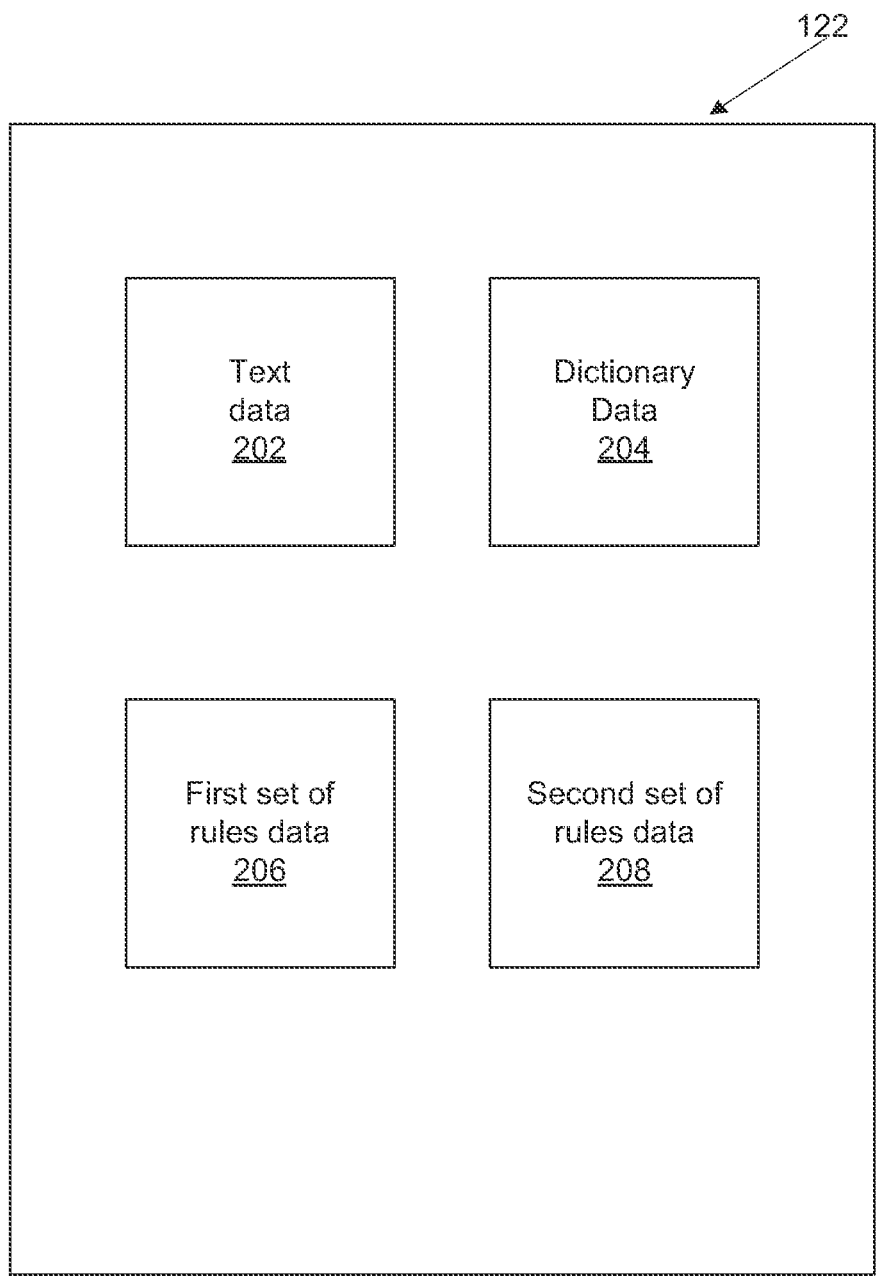
FIG. 2 is a block diagram illustrating a database in accordance with an embodiment.

In an embodiment, as represented in FIG. 2, database 122 includes a text data 202, a dictionary data 204, a first set of rules data 206, and a second set of rules data 208.

Referring back to FIG. 1, POS system 100 includes selection module 114, which is configured to select the text from text data 202 stored in database 122. The text includes a plurality of words. In an embodiment, the text may include at least one of a sentence, a phrase, or a paragraph. After selection of the text, selection module 114 is configured to select a word from the plurality of words in the text whose POS category is to be determined. In an embodiment, selection module 114 initially analyzes the words in order to determine the characteristics of the words. Thereafter, selection module 114 is configured to determine a first set of candidate POS categories of the word selected from the text. In an embodiment, the first set of candidate POS categories is determined based on the definition of the word. Thus, selection module 114 based on dictionary data 204 stored in database 122 determines the first set of candidate POS categories of the selected word. In dictionary data 204, a separate entry is provided for each form of a word. Dictionary data 204 also includes all of the parts-of-speech that can represent in that form as well as morphological feature information such as whether the word is capitalized, whether it contains a hyphen, and whether it contains a digit character. Thus if the selected word has an entry in dictionary data 204, selection module 114 retrieves the entry including the associated first set of candidate POS categories. For example, some words can be treated as both a noun and a verb, thus selection module 114 will determine all possible first set of candidate POS categories for the selected word.

If the selected word from the text does not have an entry in the dictionary, then selection module 114 searches for the stem of said word in the dictionary. For example, the word "bushes" may be looked under "bush" in the dictionary by selection module 114 to determine its associated first candidate POS categories.

In another embodiment, if the selected word or the stem of the selected word does not have an entry in the dictionary, selection module 114 is configured to check the spelling of the selected word. If the spelling of the selected word is found to be incorrect, selection module 114 corrects the cited spelling errors in said word based on a third set of rules. The third set of rules includes a collection of spelling rules. In an embodiment, the third set of rules is stored in database 122.

In an embodiment, if the selected word is corrected for spelling errors, then selection module 114 again determines the first set of candidate POS categories of said word selected from the text.

Selection module 114 is also configured to determine if there are more words in the selected/retrieved text from text data 202. If there are more words present in the text, selection module 114 will select the next word from the text and determine the associated candidate POS category for the next word. Similarly, for each of the words in the text, selection module 114 determines the associated candidate POS category.

Once the first candidate POS categories is determined for the selected word, thereafter first rule module 116 of POS system 100 is configured to apply a first set of rules to said word. The first set of rules includes a logical collection of externalized contextual rules, and is stored in first set of rules data 206 in database 122. The first set of rules is applied to the word in order to determine one or more contexts associated with the word. The one or more context specifies a relation between the selected word and the one or more other words in the text. Further based on the determined one or more contexts, a second POS categories is determined by first rule module 116 from the first candidate POS categories. For example, in sentences "I went fishing for some sea bass" and "The bass line of the song is weak", on applying the first set of rules by first rule module 116, it is determined that in the first sentence, the term "bass" is used in context of fish, whereas in the second sentence the term "bass" is used in context of the instrument. Thus, first rule module 116 will determine the second set of candidate POS categories of the term "bass" depending upon the context in which the term "bass" is used in a particular sentence.

In an embodiment, the first set of rules can be configured and extended making POS system 100 adaptive.

Second rule module 118 is configured to apply a second set of rules to the selected word. The second set of rules is obtained from second set of rules data 208 in database 122. The second set of rules is applied to the selected word in order to determine the POS category from the second set of candidate POS categories.

In an embodiment, the second set of rules includes a logical collection of abstract rules. Various examples of the abstract rules are mentioned below; however, it is apparent to a person skilled in the art that various other rules can also be applied without departing from the scope of the ongoing description. Examples of Abstract Rules:

If the selected word is a present participle, and is the first word in the text and is followed by a "to be" verb, then the POS category of the selected word will be a noun. For example, the word 'shipping' is tagged as a noun in the sentence "Shipping is a major industry in the Netherlands".

If the selected word is a noun, and is preceded by an article and followed by a "to be" verb, then the POS category of the selected word will be a noun. For example, the word 'run' is tagged as a noun in the sentence "I saw that the run was not permitted".

If the selected word is an ordinal number, and is preceded by an article or adjective and is followed by a noun, then the POS category of the ordinal number will be an adjective. For example, the word 'third' is tagged as an adjective in the sentence "I saw the band play for the third time last summer".

If the selected is an adverb or adjective, and precedes a word that is definitely a verb, then the POS category of the selected word will be an adverb. For example, the word 'just' is tagged as an adverb in the sentence "He just went to the shop."

If the last word in the sentence is a verb and we have not yet found a verb in the text, then the POS category will be a verb. For example, the word 'jumps' is tagged as a verb in the sentence, "Without waiting for another moment, the dog jumps".

The second set of rules is defined in a manner such that each of the second set of rules is applied to the selected word in a pre-defined logical order. In an embodiment, the second set of rules are ordered by strength such that the second set of rules which are more robust and apply to more words in the text come before the rules which apply to fewer words or are less likely to be correct.

In an embodiment, the second set of rules is non-linear such that the entire text is run through each of the second set of rules. Each of the second set of rules may run through the words in the text in a different order. In an embodiment, one or more rules of the second set of rules may modify the POS category at the beginning of the text. In another embodiment, the one or more rules of the second set of rules may modify the POS category at the end. In yet another embodiment, the one or more rules of the second set of rules may modify the POS category only in the middle, using contextual clues that appear either before or after the selected word.

POS tagger module 120 is configured to assign the POS category to the selected word, wherein the POS category is determined based on the first and the second set of rules applied to the selected word in the text.

In an embodiment, POS tagger module 120 assigns either the first set of candidate POS categories or the second set of candidate POS categories as the POS category if the first POS categories and the second POS categories are identical. In yet another embodiment, POS tagger module 120 assigns the first set of candidate POS categories as the POS category if the second set of rules does not contain a suitable rule corresponding to the selected word in the given text. In yet another embodiment, POS tagger module 120 assigns the first set of candidate POS categories as the POS category and does not apply the second set of rules.

POS system 100 is implemented using a model-driven architecture where it can be extended in an adaptive manner without any programming. The second set of rules are implemented at an abstract level (representing the model in the model-driven architecture) and are governed by a comprehensive set of externalized word/sense level attribute data which are stored as data. The scope and behavior of the second set of rules can be completely determined by changes to the externalized word/sense level attribute data. Thus, such model-driven architecture makes POS system 100 determine the part-of-speech (POS) category associated with the word in the text extensible without any computer programming due to the use of the second set of rules and the externalized meta data (e.g., attribute data). For example, a user can add entries to database 122 (e.g., through a user interface facilitated by POS system 100 on display 102) in a particular format, specifying the word to be tagged and the context in which POS tagger module 120 takes a particular part of speech. That allows POS tagger module 120 to identify whether the context in the sentence matches the context specified by the rules and confirm the tag. For example, the rule may specify "the word 'rose' is a noun when preceding the words 'bushes' or 'bouquet'. The entries are specified by: (1) the word to be modified; (2) the POS category it takes; (3) an identifying rule, such as the previous POS, the previous phrase, the next word, or the next semantic type; (4) the value the rule takes; (5) any additional rule or exclusion the sentence must fulfill.

Figure 3:
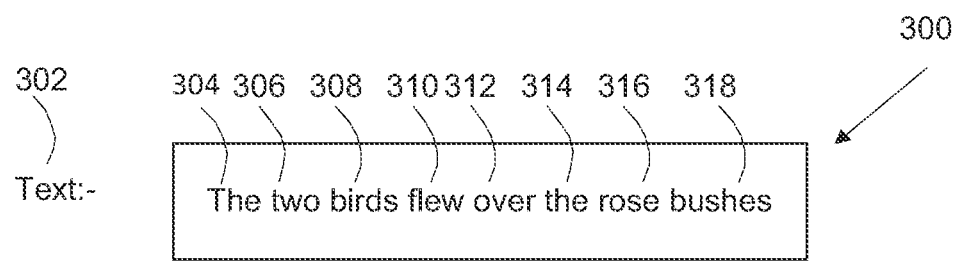
FIG. 3 is an example showing a text and a POS category associated with each word in the text in accordance with an embodiment.

FIG. 3 is an example showing a text and a POS category associated with each word in the text in accordance with an embodiment. Text 302 includes "The two birds flew over the rose bushes". The final POS category for word "the" 304 is Article, which is unambiguous. The final POS category for word "two" 306 is Adjective, changed from the original POS category of Noun. The final POS category for word "birds" 308 is Noun, which is unambiguous. The final POS category for word "flew" 310 is Verb, which is unambiguous. The final POS category for word "over" 312 is Preposition, changed from the original POS category of verb. The final POS category for word "the" 314 is Article, which is unambiguous. The final POS category for word "rose" 316 is Noun, changed from the original POS category of Verb. The final POS category for word "bushes" 318 is Noun, which is unambiguous.

Figure 4:
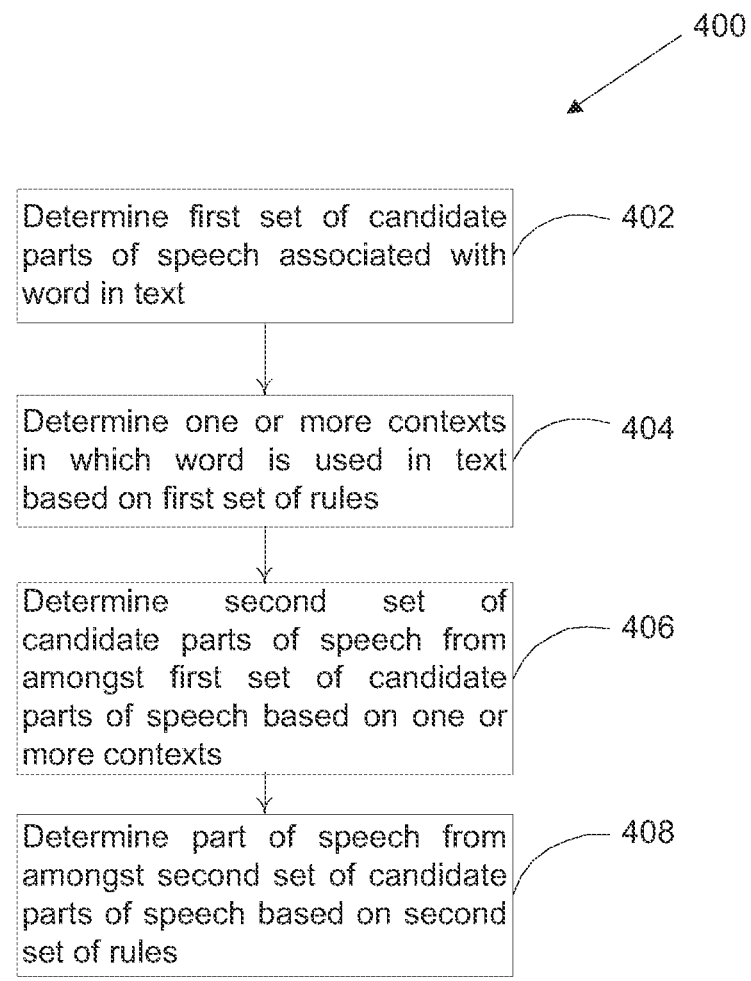
FIG. 4 is a flow diagram illustrating a method to determine a POS category associated with a word in a text in accordance with an embodiment.

FIG. 4 is a flow diagram illustrating a method to determine a POS category associated with a word in a text in accordance with an embodiment.

At step 402, the first set of candidate POS categories associated with the word in the text is determined. In an embodiment, the first set of candidate POS categories is determined by selection module 114. Selection module 114 receives the text from text data 202 in database 122. The text includes a plurality of words. It will be apparent to a person having ordinary skill in the art that the text can refer to one or more of a sentence, a phrase, a paragraph or any logical combination of words. A word from the plurality of words is selected from selection module 114 to determine the first set of candidate POS categories based on the definition of the word.

At step 404, the one or more contexts in which the word is used in text are determined based on the first set of rules. In an embodiment, the one or more contexts of the word in the text are determined by first rule module 116. The one or more contexts are determined based on the relationship of the selected word with the one or more words in the text.

At step 406, the second set of candidate POS categories from the first set of candidate POS categories is determined based on the one or more contexts. In an embodiment, the second set of candidate POS categories is determined by second rule module 118.

At step 408, the POS category from the second set of candidate POS categories is determined based on the first set of rules. In an embodiment, the POS category is determined based on POS tagger module 120.

The disclosed methods and systems, as described in the ongoing description or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the disclosure.

The computer system comprises a computer, an input device, a display unit, and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as a floppy-disk drive, optical-disk drive. The storage device may also be other similar means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or any other similar device, which enables the computer system to connect to databases and networks such as LAN, MAN, WAN, and the Internet. The computer system facilitates inputs from a user through input device, accessible to the system through an I/O interface.

The computer system executes a set of instructions that are stored in one or more storage elements in order to process input data. The storage elements may also contain data or other information as desired. The storage element may be in the form of an information source or a physical memory element present in the processing machine.

The programmable or computer-readable instructions may include various commands that instruct the processing machine to perform specific tasks such as the steps that constitute the method of the disclosure. The method and systems described can also be implemented using only software programming or using only hardware or by a varying combination of the two techniques. The disclosure is independent of the programming language used and the operating system in the computers. The instructions for the disclosure can be written in all programming languages, including, but not limited to 'C', 'C++', 'Visual C++', and 'Visual Basic'. Further, the software may be in the form of a collection of separate programs, a program module with a larger program, or a portion of a program module, as in the disclosure. The software may also include modular programming in the form of object-oriented programming. The processing of input data by the processing machine may be in response to user commands, results of previous processing, or a request made by another processing machine. The disclosure can also be implemented in all operating systems and platforms, including, but not limited to, 'Unix', DOS', 'Android', 'Symbian', and 'Linux'.

The programmable instructions can be stored and transmitted on computer-readable medium. The programmable instructions can also be transmitted using data signals. The disclosure can also be embodied in a computer program product comprising a computer readable medium, the product capable of implementing the above methods and systems, or the numerous possible variations thereof.

The method, system, and computer program product, as described above, have numerous advantages. Some of these advantages may include, but are not limited to, a fair and robust technique to determine a part-of-speech (POS) category. The POS system assigns the POS categories to words in an adaptive manner using a model-driven architecture without any programming. The experts may enhance the POS system dynamically, thus causing the continual improvement of the POS system over the period. Another benefit being the ability of POS system to correctly assign the POS categories to the words that are ambiguous and are part of incomplete sentences.

While various embodiments have been illustrated and described, it will be clear that the disclosure is not limited to these embodiments. Numerous modifications, changes, variations, substitutions, and equivalents will be apparent to those skilled in the art without departing from the spirit and scope of the disclosure as described in the claims.

The claims can encompass embodiments in hardware, software, or a combination thereof.

It will be appreciated that variants of the above disclosed and other features and functions, or alternatives thereof, may be combined to create many other different systems or applications. Various unanticipated alternatives, modifications, variations, or improvements therein may be subsequently made by those skilled in the art, and they are also intended to be encompassed by the following claims.

What is claimed is:

1. A method to determine a part-of-speech (POS) category associated with a word in a text containing a plurality of words, the method comprising:
   a) receiving the text which comprises a plurality of words;
   b) selecting the word from the plurality of words;
   c) determining a first set of candidate POS categories associated with the selected word based on a definition of the word in a dictionary;
   d) retrieving a first set of rules, said first set of rules comprising a collection of externalized contextual rules;
   e) retrieving a second set of rules, the second set of rules comprising a logical collection of language usage rules,
   f) determining one or more contexts in which the word is used in the text based on the first set of rules, wherein determining the one or more contexts further comprises determining the relation between the word and one or more other words in the text,
   g) determining a second set of candidate POS categories from the first set of candidate POS categories based on the one or more contexts; and
   h) determining the POS category from the second set of candidate POS categories based on a second set of rules, wherein each of the second set of rules are applied in a pre-defined order in which each of the second set of rules are to be applied to the word.

2. The method of claim 1, wherein the second set of rules are non linear such that the entire text is run through each of the second set of rules, and wherein each word of the text is subject to the second set of rules in a different order.

3. The method of claim 1 further comprising correcting spelling errors in the word based on a third set of rules, wherein the third set of rules comprises a collection of spelling rules.

4. The method of claim 1, wherein the text comprises at least one of a sentence, a phrase, or a paragraph.

5. The method of claim 1, wherein the POS category is a linguistic category of the word that comprises at least one of: a noun, a verb, an adjective, or an adverb.

6. The method of claim 1, wherein the second set of rules are applied in order of decreasing priority.

7. The method of claim 1 further comprising customizing the first set of rules.

8. The method of claim 1 further comprising defining the first and the second set of rules.

9. A system for assigning a part-of-speech (POS) category to a word in a text, said system comprising:
   one or more processors;
   a memory accessible by the processors, the memory comprising:
      a selection module configured to determine a first set of candidate POS categories of the word;
      a first rule module configured to apply a first set of rules to the word to:
         determine one or more contexts associated with the word;
         determine a second set of candidate POS categories from the first candidate POS categories based on the one or more contexts;
      a second rule module configured to apply a second set of rules to the word in pre-defined order to determine the POS category from the second set of candidate POS categories; and
      a POS tagger module configured to assign the POS category to the word, wherein the POS category is determined based on the first set of rules and the second set of rules.

10. The system of claim 9, wherein the selection module is configured to select the word in the text.

11. The system of claim 9, wherein the first set of rules comprises a logical collection of externalized contextual rules.

12. The system of claim 9, wherein the second set of rules comprises a logical collection of language usage rules defined in order of decreasing priority.

13. The system of claim 9, wherein the assignment of the POS category to the word in performed in an adaptive manner using a model-driven architecture without any programming.

14. A computer program product for use with a computer having a microprocessor, the computer program product comprising a non-transitory computer readable program code embodied therein for determining a part-of-speech (POS) category of a word in a text, the computer readable program code comprising:
   program instruction means for determining a first set of candidate POS categories associated with the word; and
   program instruction means for determining a POS category based on a first set of rules and a second set of rules, wherein the first set of rules determine a second set of candidate POS categories from the first set of candidate POS categories, and wherein the second set of rules determine the POS category from the second set of candidate POS categories.

15. The computer program product of claim 14 further comprises a program instruction means for defining the first and the second set of rules respectively.

16. The computer program product of claim 14 further comprises a program instruction means for applying the second set of rules in a pre-defined order.

17. The computer program product of claim 14 further comprises a program instruction means for correcting spelling errors in the word based on a third set of rules, wherein the third set of rules comprising a collection of spelling rules.

* * * * *